United States Patent
Reischl et al.

(10) Patent No.: US 7,012,418 B2
(45) Date of Patent: Mar. 14, 2006

(54) MEASURING SYSTEM WITH RATIOMETRIC FREQUENCY OUTPUT

(75) Inventors: Rolf Reischl, Stuttgart (DE); Joerg Brueckner, Sindelfingen (DE); Manfred Strohrmann, Karlsruhe (DE); Marco Neuscheler, Reutlingen (DE); Hans Loistl, Cleebronn (DE); Axel-Werner Haag, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/486,641

(22) PCT Filed: Aug. 13, 2002

(86) PCT No.: PCT/DE02/02628

§ 371 (c)(1),
(2), (4) Date: Feb. 11, 2004

(87) PCT Pub. No.: WO03/019116

PCT Pub. Date: Mar. 6, 2003

(65) Prior Publication Data

US 2004/0183516 A1     Sep. 23, 2004

(30) Foreign Application Priority Data

Aug. 18, 2001 (DE) .................................. 101 40 617

(51) Int. Cl.
*G01N 27/00* (2006.01)

(52) U.S. Cl. .................. 324/71.1; 324/76.82; 73/23.24

(58) Field of Classification Search ............... 324/71.1, 324/76.19, 76.82; 73/23.24, 23.31
See application file for complete search history.

(56) References Cited

U.S. PATENT DOCUMENTS

| | | | | |
|---|---|---|---|---|
| 4,626,621 | A | | 12/1986 | Hiyama |
| 4,858,158 | A | * | 8/1989 | Ishikawa ..................... 702/176 |
| 5,231,884 | A | * | 8/1993 | Zolock .................. 73/861.356 |
| 5,889,205 | A | * | 3/1999 | Treinies et al. ............. 73/118.2 |
| 6,405,577 | B1 | * | 6/2002 | Hanashiro et al. ......... 73/23.31 |
| 6,528,982 | B1 | * | 3/2003 | Yanagisawa et al. .... 324/76.77 |
| 2002/0000800 | A1 | * | 1/2002 | Hill ......................... 324/76.82 |

FOREIGN PATENT DOCUMENTS

NL      8 001 444 A      10/1981

* cited by examiner

*Primary Examiner*—Anjan Deb
*Assistant Examiner*—Marina Kramskaya
(74) *Attorney, Agent, or Firm*—Michael J. Striker

(57) ABSTRACT

A measuring device, with a digital interface for the transmission of digital signals to an evaluation unit, is disclosed, whereby the interface includes a clock input, to which a system clock signal is fed, a signal input, to which a measured signal is applied, an arithmetic unit, which derives an output signal from the clock signal and measured signal, and a signal output where the output signal is output and transmitted to the evaluation unit. Measurement accuracy may be improved by transmitting a reference signal that is a signal derived from the clock signal, and using this reference signal to correct the output signal.

20 Claims, 2 Drawing Sheets

MEASURING SYSTEM WITH RATIOMETRIC FREQUENCY OUTPUT

BACKGROUND OF THE INVENTION

The present invention relates to a measuring system with ratiometric frequency output and a method for improving the measurement accuracy of such a system.

Measuring systems having one or several sensors and an associated evaluation unit are widespread. To illustrate the principal design of measuring systems of this type, an air-mass sensor that is known from automotive technology will be described hereinbelow in greater detail as an example. The invention should not be limited to air-mass sensors, however.

In order to determine the flow of a flowing medium, such as air, fuel-injection installations include a mass flow meter, which is also referred to in the literature as an air-mass sensor. With known mass-flow sensors of this type, the sensor element is exposed to a stream of air in the intake manifold of the internal combustion engine. The sensor element has a heater and measuring resistors that are cooled via convection by the air stream, which brings about a change in resistance. The air stream flowing through the intake manifold can be determined from the unbalance of a measurement bridge. Finally, the sensor provides a measured signal, which is transmitted to a distant evaluation unit.

For this purpose, an air-mass sensor further includes a (digital) interface for transmission of the measured signal. The evaluation unit extracts the useful information from the received signal and evaluates it.

A typical example of a measuring system of this type having a digital interface is shown in a schematic representation in FIG. 3. The measuring system shown includes a measuring device 1 having an interface 5 for the transmission of digital signals to an evaluation unit 2. Measuring device 1 and evaluation unit 2 are interconnected via a cable 11.

Interface 5 is based substantially on digital circuit technology and includes a clock input 3, to which a clock pulse having a certain frequency (e.g., 10 MHz) is supplied, and a signal input 10, to which the measured signal from the sensor is applied.

Interface 5 further includes an arithmetic unit 6, which processes the measured signal and outputs a corresponding signal at signal output 7 of interface 5.

The output signal is typically a signal derived from the system clock signal and the measured signal. As a result, a linear relationship usually exists between the clock signal and the output signal.

Transmission of the useful information (the measured value) can be carried out basically using all known transmission methods, such as modulation procedures. The useful information can also be depicted in the on/off ratio or in the frequency and/or period duration of the output signal.

With known systems, the useful signal is usually contained in the period duration of the output signal, since a coding of this type is relatively easy to realize and it enables very high measurement accuracy.

The system clock signal that is applied to clock input 3 is generated by a pulse generator 4, such as an oscillator or quartz. Oscillators or quartzes of this type can have high tolerances and/or pulse fluctuations. The deviation of the system clock signal affects the output signal in a directly proportional manner, however, and can therefore strongly interfere with measurement accuracy.

With applications having a large measuring range, in particular, measuring systems of this type can fulfill the specified requirements for measurement tolerance only if highly-accurate quartzes and/or oscillators are used. Precise quartzes are correspondingly expensive, however, and they cannot be integrated directly, due to reasons of cost.

SUMMARY OF THE INVENTION

The object of the present invention, therefore, is to create a measuring system that functions with economical quartzes and/or oscillators, yet has narrow measurement tolerances.

The fundamental idea of the invention is to derive an additional reference signal from the system clock signal and transmit it to the evaluation unit. Said reference signal is used to calculate a correction factor that reflects the deviation of the timing frequency from a desired timing frequency and, therefore, the deviation of the frequency and/or the period duration of the measured output signal from the non-deviating output signal. This correction factor is taken into account in the evaluation of the output signal, i.e., the frequency deviation of the reference signal is used to correct the output signal.

The frequency of the reference signal and/or its period duration is preferably less than that of the clock signal by a factor N, and is located, in particular, in a range of less than 100 Hz, in particular less than 50 Hz, and preferably at approximately 20 Hz. In contrast, the clock signal has a frequency of 10 MHz, for example.

According to a preferred embodiment of the invention, the interface of the sensor has a variable-frequency signal output, i.e., the output signal has a different period duration depending on the measured signal.

According to a preferred embodiment of the invention, the evaluation unit includes an arithmetic unit, in particular to calculate the correction factor for correction of the output signal from the reference signal.

The measuring system according to the invention can be used in automotive technology to optimize fuel injection, for example. In this case, the measuring system would include an air-mass meter and an associated evaluation unit.

To compensate for the temperature course of the sensor curve, the air-mass meter preferably includes a temperature sensor. The values measured by the temperature sensor are also transmitted to the evaluation unit.

The temperature values are preferably transmitted together with the reference signal. According to a preferred embodiment of the invention, the temperature values are contained in the on/off ratio of the reference signal. The temperature values can also be transmitted via other transmission paths or by means of other transmission methods, however.

According to a preferred embodiment of the invention, the period duration of the output signal is quantized in step widths of <=500 ns and, preferably, <=200 ns. The frequency of the output signal is preferably between approximately 1.5 and 12 kHz.

The transmission of measured values take place according to standard characteristic curves, in particular. That is, the measured values are preferably normalized and are therefore independent of the particular dimensions of the measurement site, such as the intake manifold of an engine.

The characteristic curve of the measuring device is, for example, an nth-order polynomial, and, in particular, a third-order polynomial.

The invention will be described in greater detail hereinbelow with reference to the attached figures.

DETAILED DESCRIPTION OF THE PREFERRED EMBODIMENT

Figure 1:
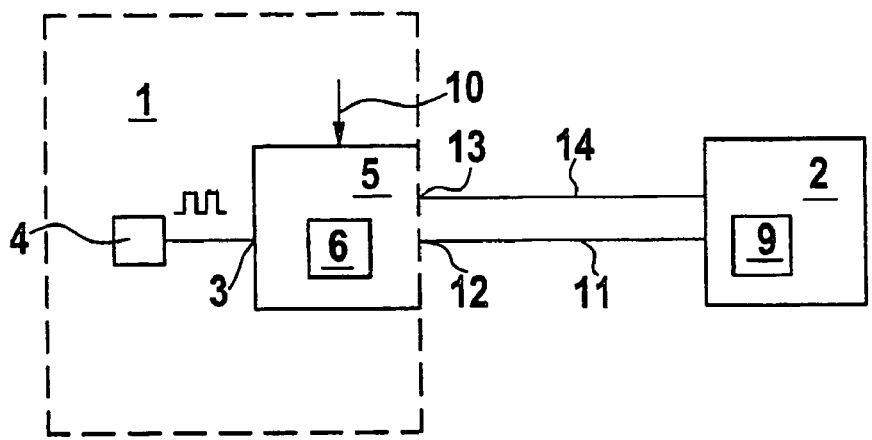
FIG. 1 is a principal representation of a measuring system with a digital interface according to an embodiment of the invention.

FIG. 1 shows a measuring system that is composed of a measuring device 1 and an evaluation unit 2 that are interconnected via a cable 11.

The measuring device 1 includes an interface 5 for the transmission of digital signals to evaluation unit 2, whereby interface 5 has a clock input 3 and a signal input 10.

The clock pulse that is fed to clock input 3 is generated by a pulse generator 4, such as a quartz or an oscillator, and has a frequency of approximately 10 MHz, whereby the frequency can have relatively high deviations and/or fluctuations depending on the quality of the pulse generator.

Measuring device 1 is based substantially on digital signal processing and outputs a digital measurement signal at interface 5. An arithmetic unit contained in interface 5 processes the supplied clock pulse and measured signal and, from them, calculates an output signal, the frequency and/or period duration of which depends on the measured signal. The output signal is therefore a signal with variable period duration, that is derived from the system clock signal and the measured value. There is a linear relationship, in particular, between the period duration of the system clock signal and the output signal.

The useful information, i.e., the measured value, that is contained in the period duration and/or the frequency of the output signal therefore exhibits the same deviations as the clock signal.

To compensate for these deviations, a reference signal is generated that is derived from the clock signal. The reference signal is transmitted via a reference signal output 13 of interface 5 to evaluation unit 2, and has a relatively low frequency of approximately 20 Hz.

The deviation of the period duration of the reference signal is taken into account in the evaluation of the measured signal. To accomplish this, an arithmetic unit 9 contained in evaluation unit 2 calculates a correction factor k, with $$k = \frac{T_{desired}}{T_{actual}}$$

whereby $T_{desired}$ is the value of a desired period duration, and $T_{actual}$ is the period duration of the reference signal that is actually measured. A ratiometric measurement is therefore carried out.

Finally, arithmetic unit 9, taking correction factor k into account, determines the actual measured value, such as an air mass that is flowing through a passage. The characteristic curve used in this example is a third-order polynomial, which yields, as the result, the percentage of a maximum air mass $m_{max}$:

$$\frac{m}{m_{max}} = \frac{1}{a} + \frac{1}{b}\left(\frac{T_0 - T_K}{T_{norm}}\right) + \left(\frac{T_0 - T_K}{T_{norm}}\right)^3$$

whereby a is an absolute portion of the standard characteristic curve, b is a linear portion of the standard characteristic curve, T0 is a characteristic curve offset, Tnorm is the characteristic curve range, and TK is the corrected period duration.

The corrected period duration $T_K$ is calculated as follows:

$$TK = k \cdot T_M$$

Whereby $T_M$ is the period duration that is measured.

Figure 2:
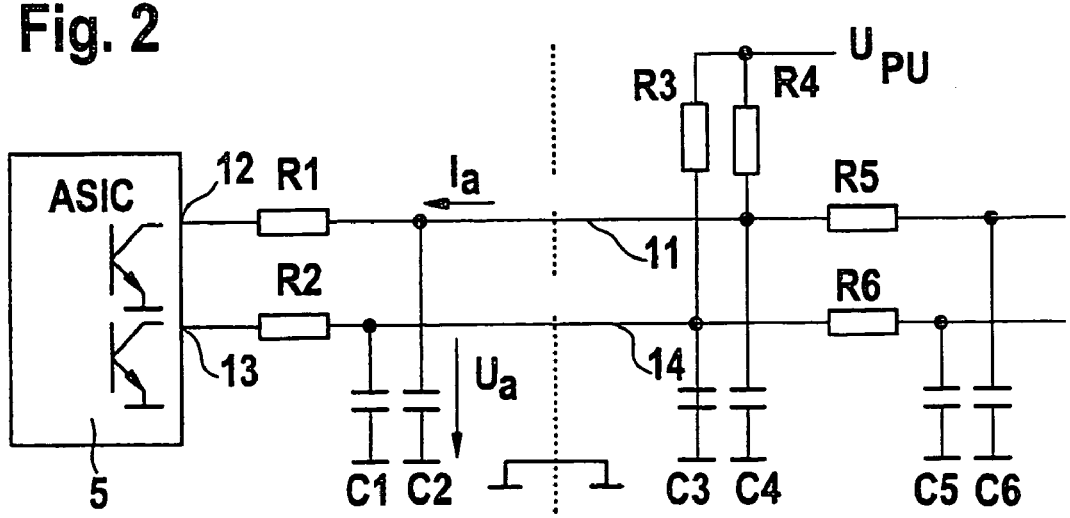
FIG. 2 shows the interconnection of sensor interface and evaluation unit.
Figure 3:
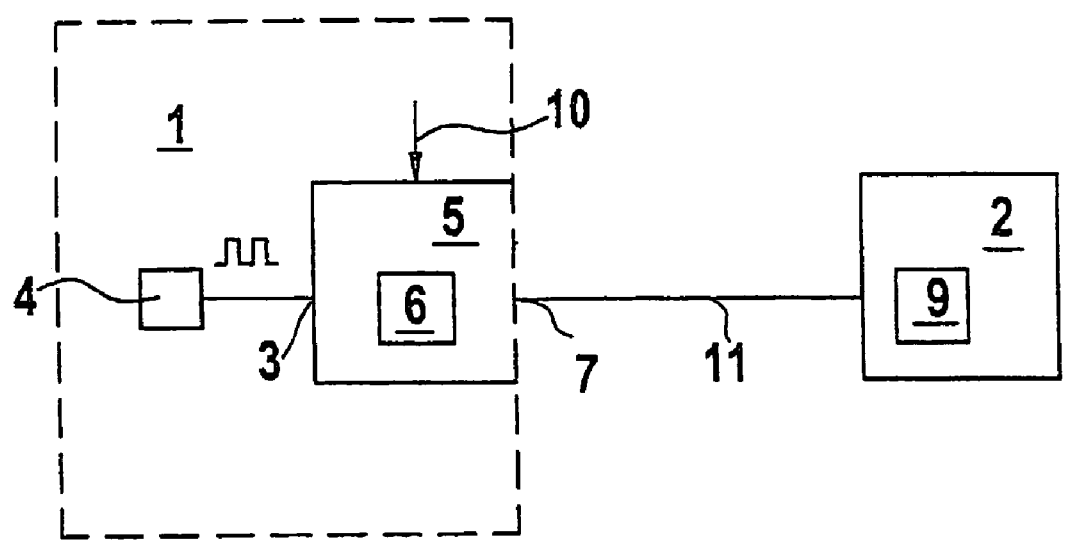
FIG. 3 shows an example of a measuring system of the prior art as described above.

FIG. 2 shows the interconnection of interface 5 and evaluation unit 2 (engine control device) in detail. Digital interface 5 has a clock input 3 and a signal input 10. Interface 5 is configured as an ASIC and further has a signal output 12 for a first measured signal (air mass) and a signal output 13 for the reference signal and a second measured signal (temperature).

The two signal outputs 12, 13 are each terminated with a resistor R1, R2 and a capacitor C1, C2 that is connected to ground. Capacitors C1, C2 serve to shunt high-frequency interfering components, in particular to comply with EMC regulations.

The measured signal for the determination of air mass is transmitted via line 11, and the measured signal for the determination of temperature is transmitted via line 14 to the engine control device.

The evaluation of the transmitted signal information takes place according to normalized standard characteristic curves, so that the engine control device can determine the physical values for air mass and temperature using defined arithmetic operations.

The engine control device further includes a pull-up circuit for generation of a high level. The pull-up circuit has resistors R3 and R4, one connection each of which is joined with a transmission line 11, 14, and the other connection each of which is connected to a supply voltage $U_{pu}$.

Capacitors C3, C4 that are also connected to ground are provided to eliminate interference from lines 11, 14.

Furthermore, the engine control device includes an RC low-pass filter for each line 11, 14 to protect a downstream controller (not shown). The RC low-pass filters have resistors R5, R6 and capacitors C5, C6.

The rise time and fall time of the signal flanks of the measuring device are limited, whereby the rise time is determined primarily by the pullup circuit in the engine control device.

The final stage of the measuring device is protected against the usual environmental influences, such as ESD, incident radiation, interference pulses, etc., and should also be able to withstand faulty operations, such as short circuits.

LIST OF REFERENCE NUMERALS

1 Measuring device
2 Evaluation unit
3 Clock input
4 Pulse generator
5 Interface
6 Arithmetic unit 7 Signal output
8 Reference signal output
9 Arithmetic unit
10 Signal input
11 Cable
12 Signal output
13 Reference signal output
14 Cable
R1–R6 Resistors
C1–C6 Capacitors

What is claimed is:

1. A measuring system comprising a measuring device (1) with a digital interface (5) and an evaluation unit (2), wherein the measuring device (1) is a mass flow meter whereby the interface (5) has
 a clock input (3), to which a pulse generator (4) is connected,
 a signal input (10), to which a measured signal is applied,
 an arithmetic; unit (6) that generates an output signal derived from the clock signal and the measured signal, and
 a signal output (12), where the output signal is output and transmitted to the evaluation unit (2),
 wherein the interface (5) has a further signal output (13) where a reference signal derived from the clock signal is output, whereby the reference signal is used by the evaluation unit (2) to correct the output signal.

2. The measuring system as recited in claim 1, wherein the frequency of the reference signal is less than that of the clock signal by a factor N.

3. The measuring system as recited in claim 1, wherein the output signal has a different period duration depending on the measured signal.

4. The measuring system as recited in claim 1, wherein :he evaluation unit (2) has an arithmetic unit (9) for calculating a correction factor to correct the output signal.

5. The measuring system as recited in claim 1, wherein the measuring device (1) has a second sensor, and the measured values tare transmitted to the evaluation unit (2).

6. The measuring system as recited in claim 5, wherein the measured values from the second sensor are transmitted together with the reference signal.

7. The measuring system as recited in claim 6, wherein the measured value from the second sensor is contained in the on/off ratio of the reference signal.

8. The measuring system as recited in claim 1, wherein the measuring device (1) is an air-mass meter, and the evaluation unit (2) is an engine control device.

9. The measuring system as recited in claim 1, wherein the period of the output signal is quantized in step widths of <=500 ns.

10. The measuring system as recited in claim 1, wherein the evaluation unit (2) has an arithmetic unit (9) that evaluates the output signal.

11. The measuring system as recited in claim 10, wherein the characteristic line of the measuring device is an nth-order polynomial.

12. The measuring system as recited in claim 1, wherein the frequency of the reference signal is <100 Hz.

13. The measuring system as recited in claim 1, wherein be frequency of the output signal is between 1.5 and 12 kHz.

14. A method for correcting the output signal of a measuring device, being a mass flow meter and having a digital interface, to which a measured signal and a clock signal are fed, characterized by the following steps:
 generation of an output signal derived from the dock signal and the measured signal, and transmission of the output signal to an evaluation unit (2);
 generation of a reference signal derived from the clock signal, and transmission of the reference signal to the evaluation unit (2);
 evaluation of the output signal, whereby deviations of the output signal are corrected with the aid of the reference signal.

15. The method as recited in claim 14, wherein a correction factor is calculated that represents the deviation of the reference signal from a desired value.

16. The method as recited in claim 14, wherein the period duration of the output signal is corrected with the aid of the reference signal.

17. The measuring system as recited in claim 1, wherein the period of the output signal is quantized in step widths of <=200 ns.

18. The measuring system as recited in claim 10, wherein the characteristic line of the measuring device is a third-order polynomial.

19. The measuring system as recited in claim 1, wherein the frequency of the reference signal is <50 Hz.

20. The measuring system as recited in claim 1, wherein the frequency of the reference signal is approximately 20 Hz.

* * * * *